(12) United States Patent
Byun et al.

(10) Patent No.: US 12,365,404 B2
(45) Date of Patent: Jul. 22, 2025

(54) ACTIVE AIR FLAP OF VEHICLE

(71) Applicant: HYUNDAI MOBIS Co., Ltd., Seoul (KR)

(72) Inventors: Jae Sup Byun, Gwangmyeong-si (KR); Kyeong Am Lee, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 542 days.

(21) Appl. No.: 17/943,592

(22) Filed: Sep. 13, 2022

(65) Prior Publication Data

US 2023/0085317 A1  Mar. 16, 2023

(30) Foreign Application Priority Data

Sep. 16, 2021  (KR) .......................... 10-2021-0124320

(51) Int. Cl.
*B62D 35/00*  (2006.01)
*B60R 19/52*  (2006.01)

(52) U.S. Cl.
CPC ............ *B62D 35/005* (2013.01); *B60R 19/52* (2013.01)

(58) Field of Classification Search
CPC .............................. B62D 35/005; B60R 19/52
See application file for complete search history.

(56) References Cited

U.S. PATENT DOCUMENTS

| | | | | |
|---|---|---|---|---|
| 9,827,848 | B1* | 11/2017 | Sangha | B62D 35/005 |
| 11,639,099 | B2* | 5/2023 | Byun | B60K 11/085 |
| | | | | 180/68.1 |
| 11,891,125 | B2* | 2/2024 | Byun | B60K 11/085 |
| 2013/0223980 | A1* | 8/2013 | Pastrick | F01D 5/00 |
| | | | | 415/1 |
| 2014/0039765 | A1* | 2/2014 | Charnesky | B60K 11/085 |
| | | | | 701/49 |
| 2017/0050510 | A1* | 2/2017 | Manhire | B60R 19/52 |
| 2017/0326967 | A1* | 11/2017 | Brueckner | B60K 11/085 |
| 2022/0080823 | A1* | 3/2022 | Kim | F01P 7/10 |
| 2022/0176810 | A1* | 6/2022 | Müller | B60K 11/085 |
| 2023/0078614 | A1* | 3/2023 | Byun | B60R 19/52 |
| | | | | 296/180.5 |
| 2023/0084648 | A1* | 3/2023 | Park | B60K 11/085 |
| | | | | 180/68.1 |
| 2023/0085317 | A1* | 3/2023 | Byun | B60K 11/085 |
| | | | | 296/180.5 |
| 2023/0182563 | A1* | 6/2023 | Jeong | B60K 11/085 |
| | | | | 180/68.1 |
| 2023/0202289 | A1* | 6/2023 | Jeong | B60K 11/085 |
| | | | | 180/68.1 |

(Continued)

FOREIGN PATENT DOCUMENTS

KR  101575255 B1  12/2015

*Primary Examiner* — Jacob B Meyer
(74) *Attorney, Agent, or Firm* — MORGAN, LEWIS & BOCKIUS LLP

(57) ABSTRACT

An active air flap of a vehicle according to one embodiment of the present invention includes a frame part which communicates with an outside air inlet of a grill, a flap part including a plurality of flap units which are rotatably connected to the frame part and sequentially open or close the outside air inlet of the grill, a rotary shaft which connects the plurality of flap units to the frame part, and a driven pinion gear connected to the rotary shaft, a driving part which transmits a driving force to the flap part, and a control unit which controls the driving part to be driven.

16 Claims, 10 Drawing Sheets

(56) References Cited

U.S. PATENT DOCUMENTS

| | | | |
|---|---|---|---|
| 2024/0051620 A1* | 2/2024 | Jeong | B62D 35/005 |
| 2024/0123817 A1* | 4/2024 | Yoon | B60K 11/085 |
| 2024/0131922 A1* | 4/2024 | Yoon | F01P 7/10 |
| 2024/0174076 A1* | 5/2024 | Yoon | B60K 11/085 |
| 2024/0300319 A1* | 9/2024 | Kim | B60K 11/085 |

\* cited by examiner

ACTIVE AIR FLAP OF VEHICLE

CROSS-REFERENCE TO RELATED APPLICATION

This application claims priority to and the benefit of Korean Patent Application No. 10-2021-0124320, filed on Sep. 16, 2021, the disclosure of which is incorporated herein by reference in its entirety.

BACKGROUND

1. Field of the Invention

The present invention relates to an active air flap of a vehicle.

2. Discussion of Related Art

An active air flap (AAF) is installed inside a bumper and a grill (or attached to the grill) of the front of a vehicle and opens or closes an outside air inlet of the grill according to a state (for example, a driving condition or the like) of the vehicle.

As a specific example, an active air flap closes a flap to close an outside air inlet in order to reduce air resistance and improve fuel efficiency when a vehicle travels at a high speed or opens the flap to open the outside air inlet in order to lower a temperature in an overheated engine room.

According to the conventional technology, an active air flap has a structural problem that, when a plurality of flap parts, which open or close an outside air inlet, rotate at the same time according to driving of an actuator, a traveling pressure increases, and thus a torque of the actuator, which rotates the flap parts, inevitably increases.

SUMMARY OF THE INVENTION

The present invention is directed to providing an active air flap of a vehicle, which sequentially controls a plurality of flap units to be driven to improve cooling efficiency and optimize aerodynamic performance.

Objectives of the present invention are not limited to the objectives described above, and other objectives which are not described above will be clearly understood by those skilled in the art through the following description.

According to one aspect of the present invention, there is provided an active air flap of a vehicle, including a frame part which communicates with an outside air inlet of a grill, a flap part including a plurality of flap units which are rotatably connected to the frame part and sequentially open or close the outside air inlet of the grill, a rotary shaft which connects the plurality of flap units to the frame part, and a driven pinion gear connected to the rotary shaft, a driving part which transmits a driving force to the flap part, and a controller which controls the driving part to be driven.

The flap part may include a stopper which fixes the flap units in an idle section when the flap units are rotated by the driving part.

The controller may receive temperature information of an engine room of the vehicle, control the driving part according to the temperature information, and sequentially open or close the flap units of the flap part.

The flap part may include a coil spring which is positioned on one end portion of the driving shaft and fixes relative positions of the frame part and the driven pinion gear.

Meanwhile, according to another aspect of the present invention, there is provided an active air flap of a vehicle, including a frame part which has a hollow structure in which vertical frames and horizontal frames are connected and communicates with an outside air inlet of a grill, a flap part which is connected to the frame part and opens or closes the outside air inlet of the grill, and a driving part which provides a driving force to the flap part.

The flap part may include a plurality of flap units which sequentially open or close the outside air inlet, rotary shafts which connect the plurality of flap units to the frame part, a driven pinion gear connected to each of the rotary shafts, and a stopper which is connected to the rotary shaft and fixes the flap units in an idle section of the rotary shaft.

The driving part may include an actuator including a driving shaft, a driving pinion gear connected to the driving shaft, a rack gear which is embedded in one of the vertical frames, has one side engaged with the driving pinion gear in a width direction so that upward and downward movement of the rack gear is adjusted in a vertical direction, and transmits the driving force to the driven pinion gear engaged with the other side of the rack gear in the width direction, and a stopper guide which is positioned in a longitudinal direction of the rack gear and guides movement of the stopper.

The rack gear may include a driving section having a plurality of first teeth at one side engaged with the driving pinion gear in the width direction and a driven section having a plurality of second teeth at the other side engaged with the driven pinion gear in the width direction.

The stopper guide may include a first guide and a second guide which are disposed in the longitudinal direction of the rack gear at positions spaced apart from each other in the vertical direction, and a portion of the first guide and a portion of the second guide may be chamfered to allow the chamfered portion of the first guide and the chamfered portion of the second guide to come into contact with the stopper.

The stopper may be positioned between and come into line contact with the first guide and the second guide while the flap units are opened or closed and may be in face contact with the first guide or the second guide when the rotary shaft idles in a state in which the flap unit is completely opened or when the rotary shaft idles in a state in which the flap unit is completely closed.

The rotary shafts may be disposed apart from each other between the vertical frames of the frame part in a vertical direction.

Cross sections of connection parts of the rotary shafts and cross sections of connection parts of the flap units may have the same polygonal shape to prevent torsion.

The rotary shafts may be snap-fitted to the plurality of flap units in a longitudinal direction.

The active air flap may further include a controller which controls the driving part to be driven through a preset instruction or manipulation of a separate switch.

According to still another aspect of the present invention, there is provided an active air flap of a vehicle, including a frame part which communicates with an outside air inlet of a grill, a flap part which opens or closes the outside air inlet, and a driving part which drives the flap part, The flap part may include a plurality of flap units which are rotatably connected to the frame part and sequentially open or close the outside air inlet, a rotary shaft which connects the plurality of flap units to the frame part, a driven pinion gear connected to the rotary shaft, and a coil spring which fixes relative positions of the frame part and the driven pinion gear.

The driving part may include an actuator including a driving shaft having one end portion connected to the coil spring, a driving pinion gear connected to the driving shaft, and a rack gear which is embedded in a vertical frame, has one side engaged with the driving pinion gear in a width direction so that upward and downward movement of the rack gear is adjusted in a vertical direction, and transmits a driving force to the driven pinion gear engaged with the other side of the rack gear in the width direction.

The rack gear may include a driving section having a plurality of first teeth at one side engaged with the driving pinion gear in the width direction and a driven section having a plurality of second teeth at the other side engaged with the driven pinion gear in the width direction.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Advantages and features of the present invention and methods of achieving the same will become apparent with reference to the accompanying drawings and the following detailed embodiments. However, the present invention is not limited to the embodiments to be disclosed below but may be implemented in various different forms, the embodiments are provided to fully explain the present invention and fully explain the scope of the present invention for those skilled in the art, and the scope of the present invention is defined by the appended claims. Meanwhile, the terms used herein are provided to describe the embodiments of the present invention and not for purposes of limitation. In the specification, unless the context clearly indicates otherwise, the singular forms include the plural forms. The term "comprise" or "comprising" used in the specification does not preclude the presence or addition of one or more components, steps, operations and/or elements in addition to stated components, steps, operations and/or elements. As used in the present specification, the term "and/or" includes any and all combinations of the associated listed items.

Hereinafter, exemplary embodiments of the present invention will be descried with reference the accompanying drawings.

Basic Structure

Figure 1:
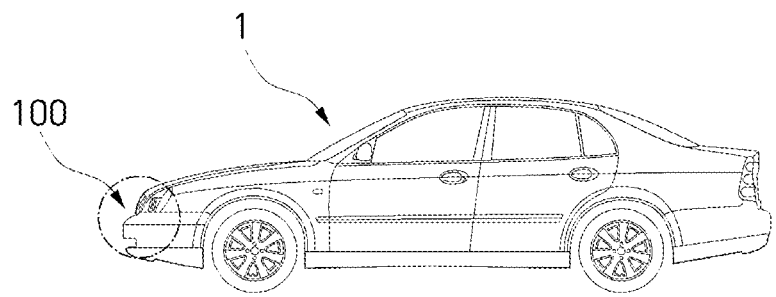
FIG. 1 is an exemplary view schematically illustrating an installation position of an active air flap according to one embodiment of the present invention.
Figure 2:
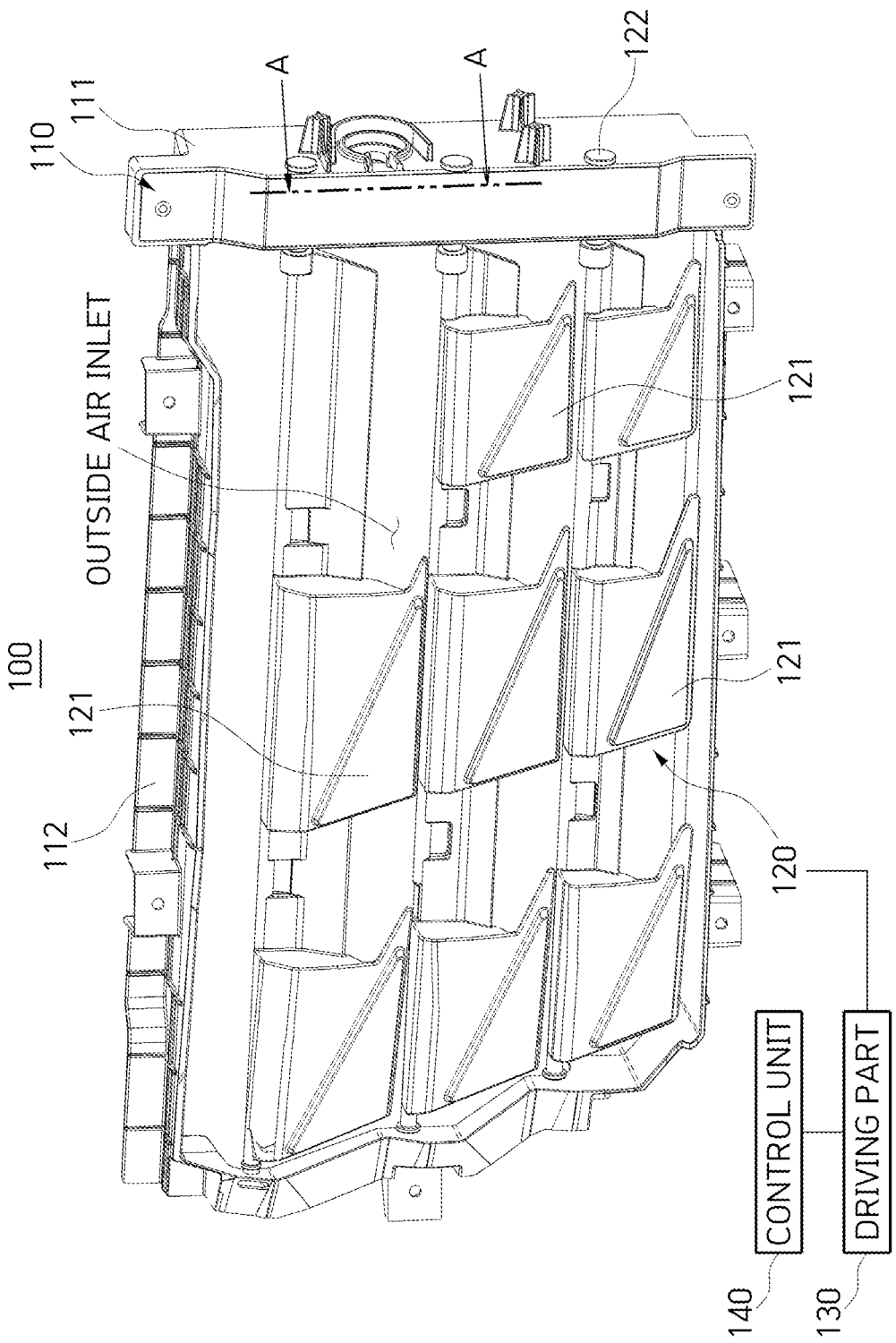
FIG. 2 is a perspective view schematically illustrating the active air flap according to one embodiment of the present invention.
Figure 3:
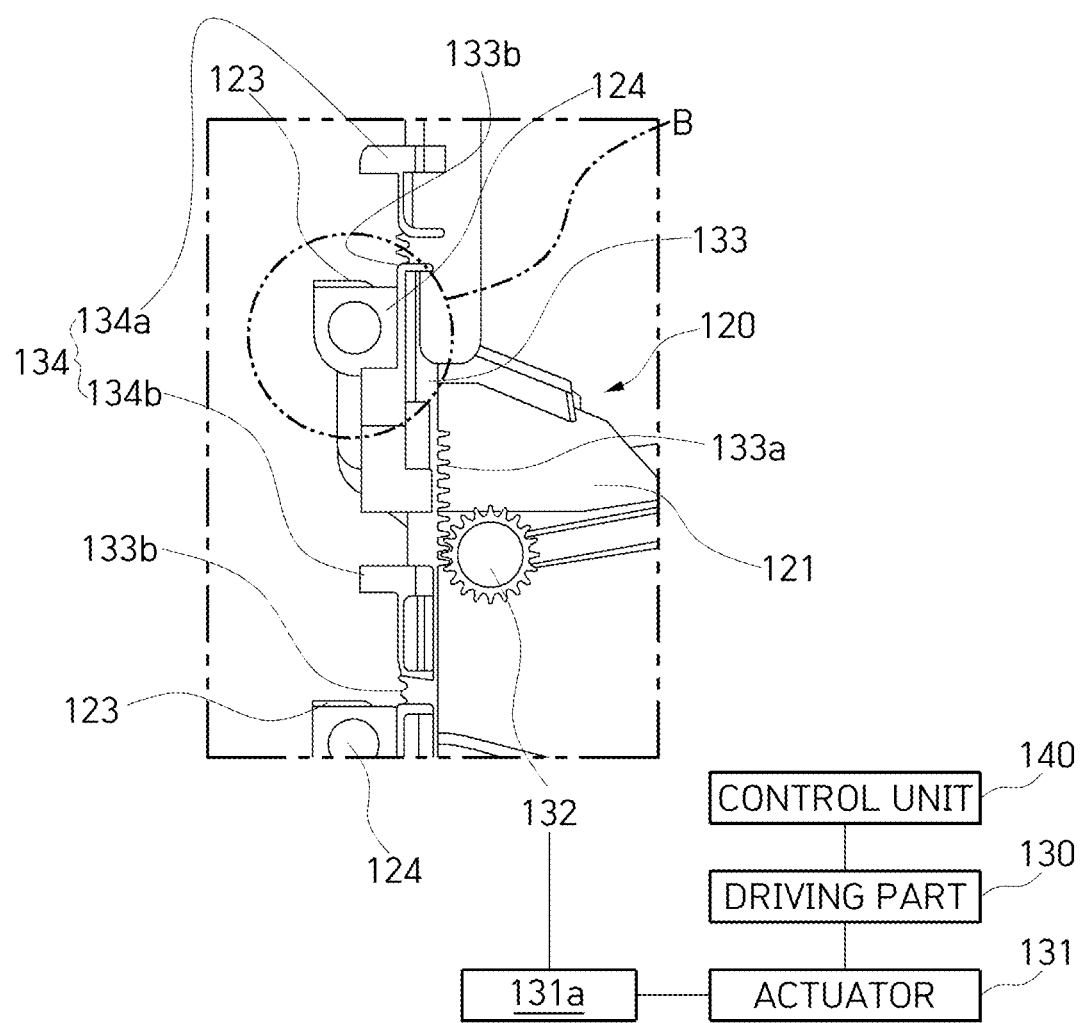
FIG. 3 is a component relationship diagram with a cross-sectional view along line A-A of FIG. 2.
Figure 4:
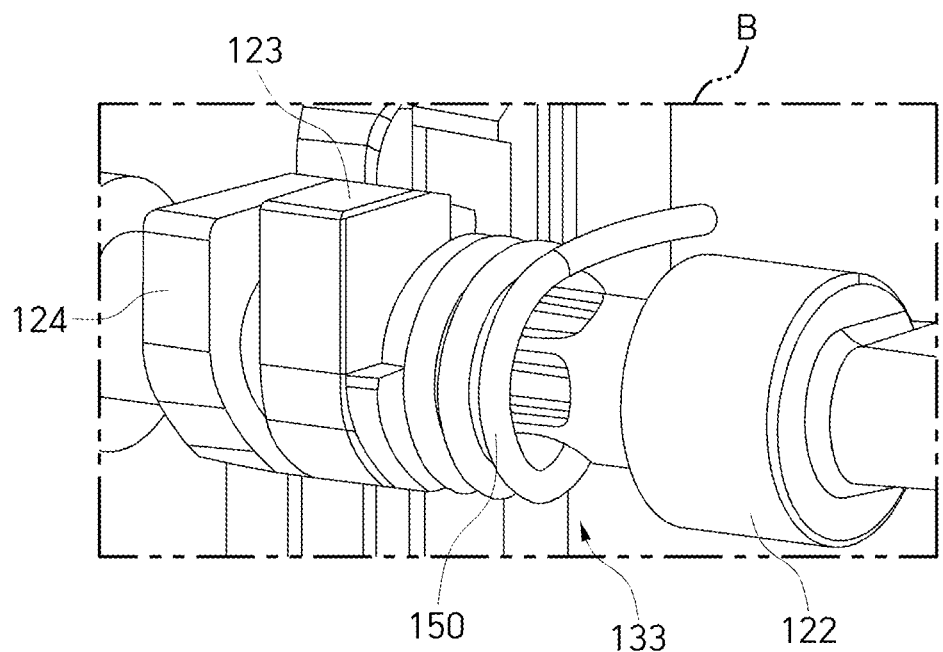
FIG. 4 is a partially enlarged view illustrating portion B marked in FIG. 3.

FIG. 1 is an exemplary view schematically illustrating an installation position of an active air flap according to one embodiment of the present invention, FIG. 2 is a perspective view schematically illustrating the active air flap according to one embodiment of the present invention, FIG. 3 is a component relationship diagram with a cross-sectional view along line A-A of FIG. 2, and FIG. 4 is a partially enlarged view illustrating portion B marked in FIG. 3.

Referring to FIGS. 1 to 4, an active air flap 100 opens or closes an outside air inlet formed in a grill of a vehicle 1. The active air flap 100 improves traveling safety of the vehicle 1 and reduces air resistance generated while the vehicle 1 travels to help improve fuel efficiency.

The active air flap 100 includes a frame part 110, a flap part 120, a driving part 130, and a control unit 140.

The frame part 110 is coupled to a region of the outside air inlet formed in the grill. The frame part 110 has a quadrangular frame shape.

The frame part 110 may be coupled to a rear surface of the grill in a screw-assembling manner. A separate fixing hole is formed in a circumference of the frame part 110, and a screw passing through the grill is firmly coupled to the frame.

The frame part 110 has a hollow structure in which vertical frames 111 and horizontal frames 112 are connected.

The vertical frames 111 are made of two panels and are disposed apart from each other in a horizontal direction in the region of the outside air inlet of the rear surface of the grill.

When the grill is viewed from the front, the vertical frames 111 may be covered by the grill, not exposed to the outside, and each disposed at one of two inner ends of the outside air inlet.

The horizontal frames 112 are made of two panels and are disposed apart from each other in a vertical direction in the region of the outside air inlet of the rear surface of the grill.

When the grill is viewed from the front, the horizontal frames 112 may be covered by the grill, not exposed to the outside, and each disposed at one of inner upper and lower ends of the outside air inlet.

The flap part 120 is rotatably connected to the frame part 110 and sequentially opens or closes the outside air inlet of the grill.

To this end, the flap part 120 includes flap units 121, rotary shafts 122, driven pinion gears 123, and a stopper 124.

The flap units 121 are units which sequentially open or close the outside air inlet, and at least one or more flap units 121 are provided apart from each other in the flap part 120 at intervals in the vertical direction. The flap units 121 are disposed in n rows so that the flap units 121 may rotate together and/or individually.

The rotary shafts 122 connect the plurality of flap units 121 to the frame part 110. The rotary shafts 122 are disposed apart from each other between the vertical frames 111 constituting both ends of the frame part 110 in the vertical direction.

Cross sections of connection parts of the rotary shafts 122 and the flap units 121 are formed in the same polygonal shape so that torsion can be prevented.

The rotary shafts 122 may also be snap-fitted to the plurality of flap units 121 in a longitudinal direction.

The driven pinion gears 123 are connected to the rotary shafts 122 and serve as power transmission media when the driving part 130 transmits power to the flap part 120.

The stopper 124 is connected to the rotary shaft 122 and serves to fix the flap unit 121 so as not to shake in an idle section of the rotary shaft 122.

The flap part 120 includes a coil spring 150 which is positioned on one end portion of a driving shaft 131*a* and fixes relative positions of the frame part 110 and the driven pinion gear 123.

The coil spring 150 may reduce a gap according to a closed state of the flap part 120 using spring torsion.

In addition, when the flap part 120 of the vehicle which travels at a high speed is closed, an operational force of the coil spring 150 may be reduced using traveling wind. For example, when a value of the sum of a torque of an actuator 131 and a magnitude of the traveling wind is greater than a value of a tension of the coil spring 150, there is no operation problem of the active air flap of the present invention. As another example, even when a value of the sum of a torque of the actuator 131 and a tension of the coil spring 150 is greater than a value of a magnitude of the traveling wind, there is no operation problem of the active air flap of the present invention.

Meanwhile, the driving part 130 provides a driving force to the flap part 120.

The driving part 130 includes the actuator 131, a driving pinion gear 132, a rack gear 133, and a stopper guide 134.

The actuator 131 is a motor which rotates the driving shaft 131*a* to transmit a driving force to the flap part 120 and may be connected to one rear end of the frame part 110.

The driving pinion gear 132 is connected to the driving shaft 131*a*.

As the rack gear 133 is embedded in the vertical frame 111 (collectively and/or individually embedded in the vertical frames), one side thereof in a width direction is engaged with the driving pinion gear 132, and upward and downward movement of the rack gear 133 is adjusted in the vertical direction, the rack gear 133 serves to transmit a driving force to the driven pinion gear 123 engaged with the other side in the width direction.

The rack gear 133 includes a driving section 133*a* having a plurality of teeth at one side thereof engaged with the driving pinion gear 132 in the width direction and a driven section 133*b* having a plurality of teeth at the other side thereof engaged with the driven pinion gear 123 in the width direction.

The stopper guide 134 is positioned in a longitudinal direction of the rack gear 133 and serves to guide the movement of the stopper 124. The stopper guide 134 includes first and second guides 134*a* and 134*b* disposed in the longitudinal direction of the rack gear 133 at positions spaced apart from each other in the vertical direction.

A chamfering process may be performed on a portion of the first guide 134*a* and a portion of the second guide 134*b* which come into contact with the stopper 124.

In this case, while the flap units 121 are opened or closed, the stopper 124 is positioned between and comes into line contact with the first guide 134*a* and the second guide 134*b*.

In addition, when the rotary shafts 122 idle in a state in which the flap units 121 are completely opened or when the rotary shafts 122 idle in a state in which the flap units 121 are completely closed, the stopper 124 is in face contact with the first guide 134*a* or the second guide 134*b*.

The control unit 140 may control the driving part 130 to be driven through a preset instruction or manipulation of a separate switch (not shown).

The control unit 140 may receive temperature information of an engine room of the vehicle 1, control the driving part 130 according to a result value of the information, and sequentially open or close the flap units 121 of the flap part 120.

Operation Mechanism

FIGS. 5 to 10 are exemplary operational views illustrating sequential states in which the active air flap according to one embodiment of the present invention is opened or closed.

Figure 5:
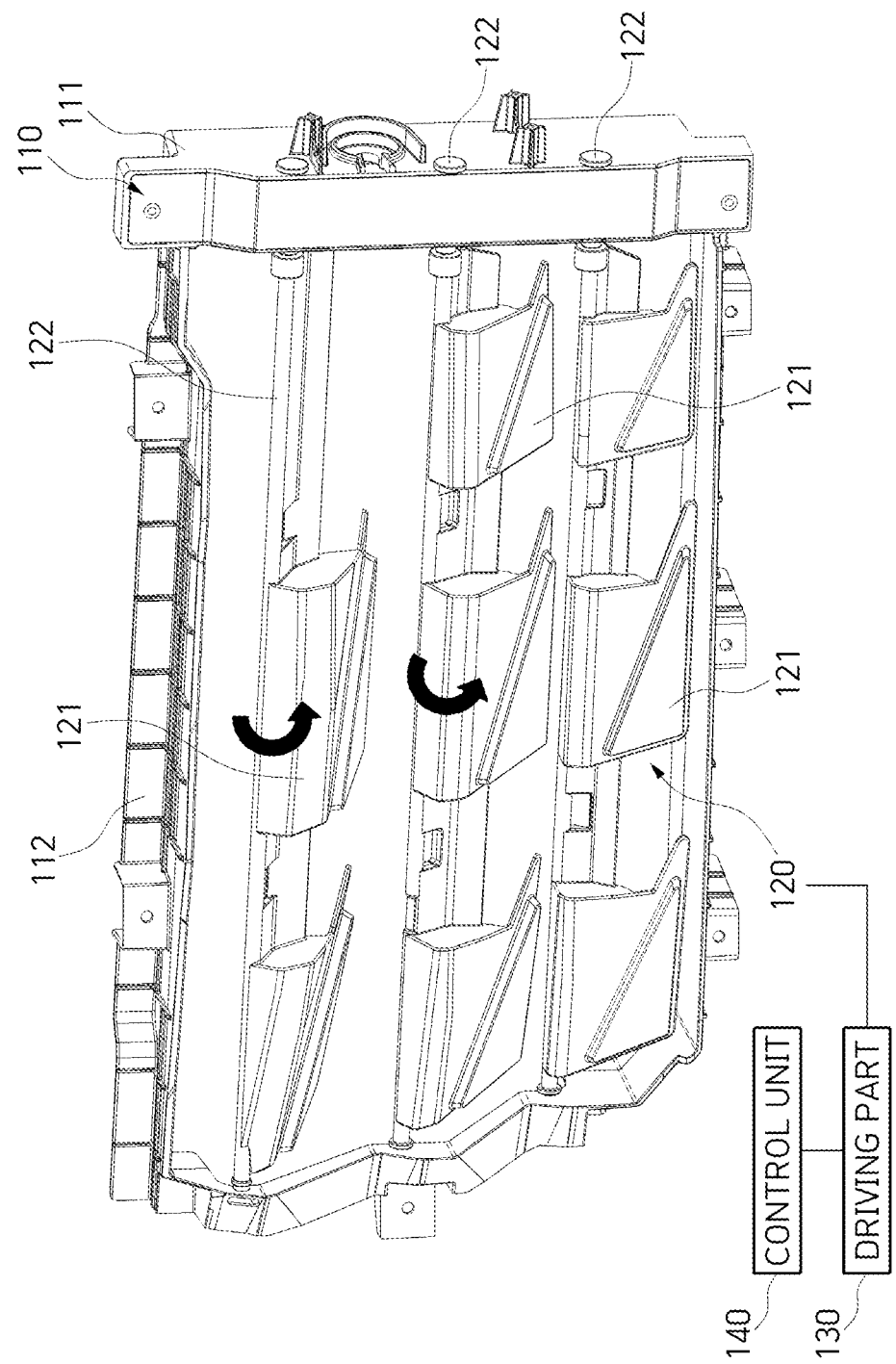
FIGS. 5 to 7 are exemplary operational views illustrating sequential states in which the active air flap according to one embodiment of the present invention is opened.
Figure 6:
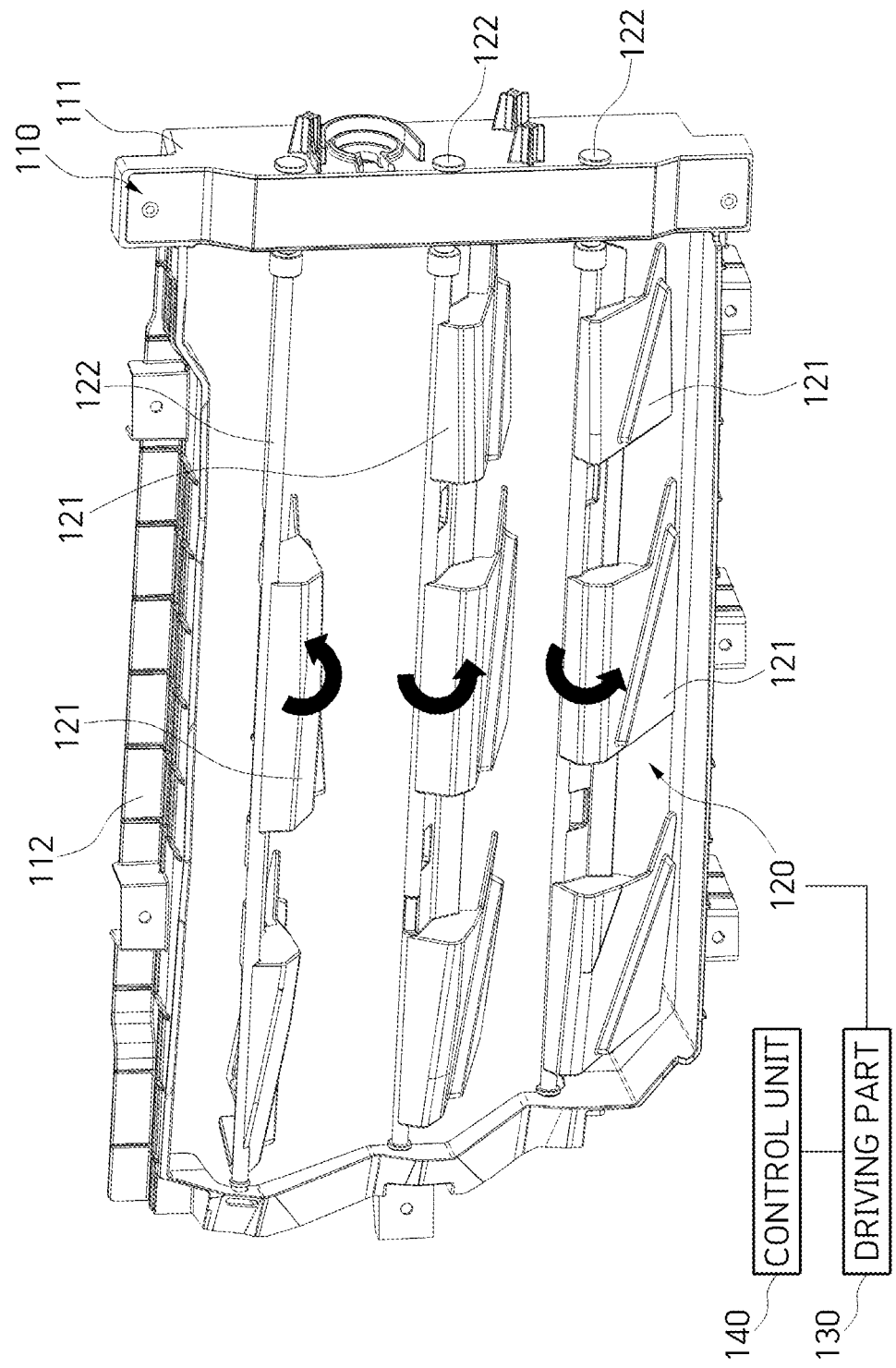
Figure 7:
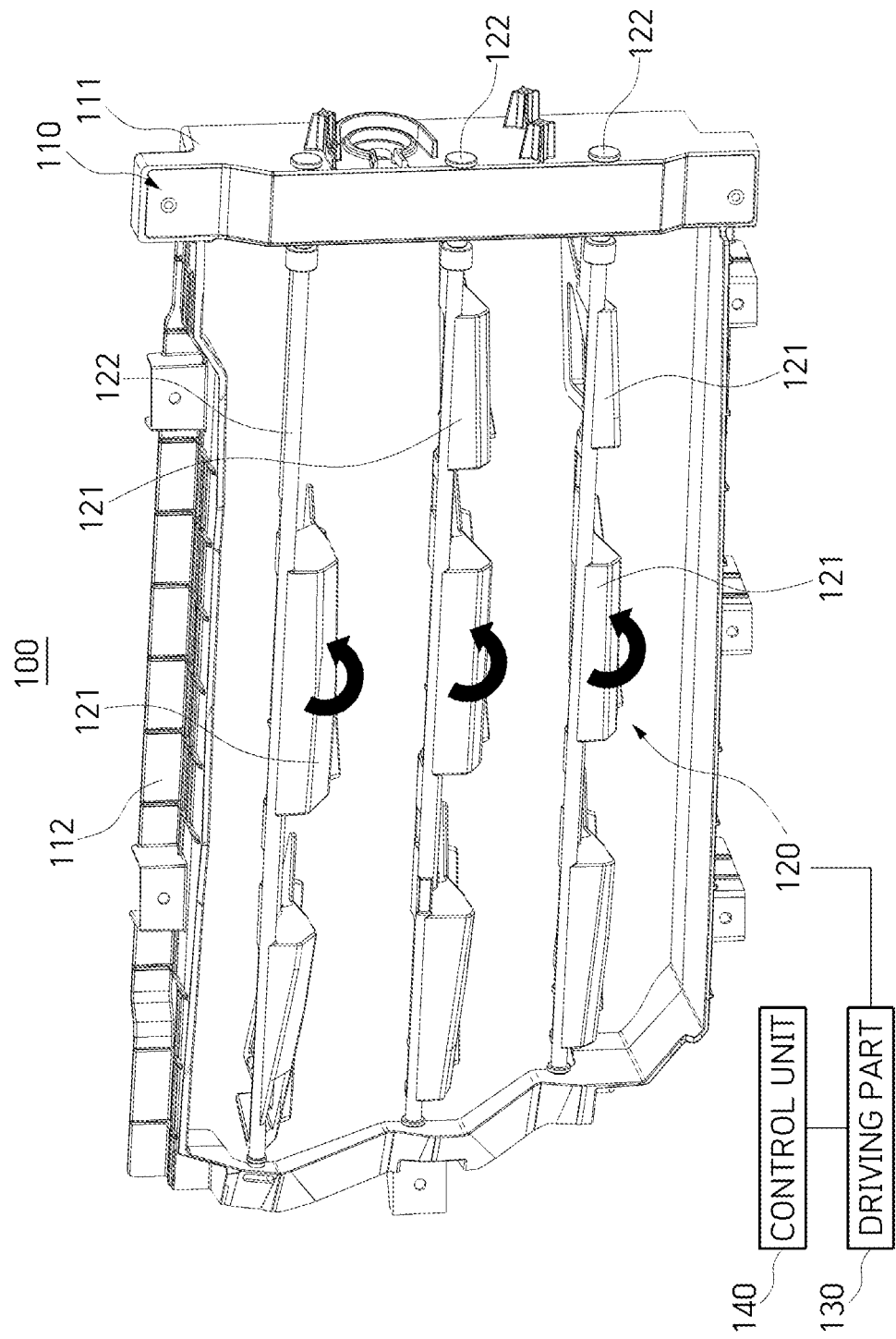

First, FIGS. 5 to 7 are sequential views illustrating a structural mechanism in which the active air flap is opened.

Referring to the drawings, an opening mechanism of the active air flap 100 will be described below.

First, the actuator 131 of the driving part 130 is driven through an instruction of the control unit 140, and the driving pinion gear 132 connected to the driving shaft 131*a* of the actuator 131 is engaged with the driving section 133*a* of the rack gear 133 and rotated in a clockwise direction.

Second, according to the rotation of the driving pinion gear 132 in the clockwise direction, the rack gear 133 converts the rotational motion of the driving pinion gear 132 into linear motion and moves linearly in an upward direction.

Third, the driven pinion gear 123 is engaged with the driven section 133*b* of the rack gear 133 and rotated in a counter-clockwise direction so that the linear motion of the rack gear 133 is converted into rotational motion again. Accordingly, the rotary shafts 122 which rotate in conjunction with the driven pinion gear 123 rotate in the counter-clockwise direction, and the flap units 121 which operate in conjunction with the rotary shafts 122 rotate in the counter-clockwise direction so that the outside air inlet is gradually opened.

In this process, the stopper 124 comes into line contact with the first and second guides 134*a* and 134*b* of the stopper guide 134 and assists the transmission of a rotational driving force to the rotary shafts 122. In addition, when the rotary shafts 122 idle in a state in which the flap units 121 are completely opened, the stopper 124 is in face contact with the second guide 134*b* so that the flap units 121 are fixed without shaking.

Figure 8:
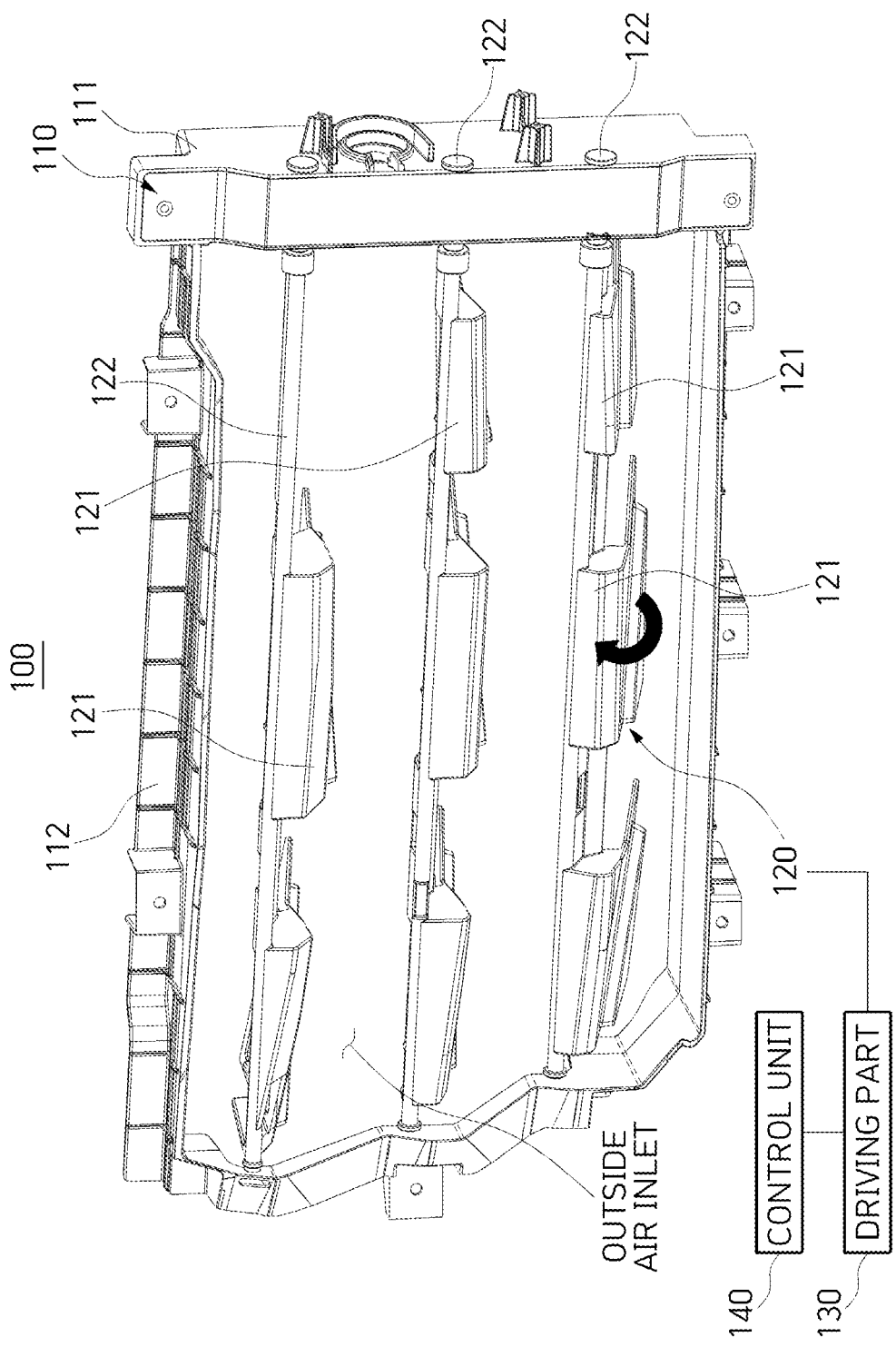
FIGS. 8 to 10 are exemplary operational views illustrating sequential states in which the active air flap according to one embodiment of the present invention is closed.
Figure 9:
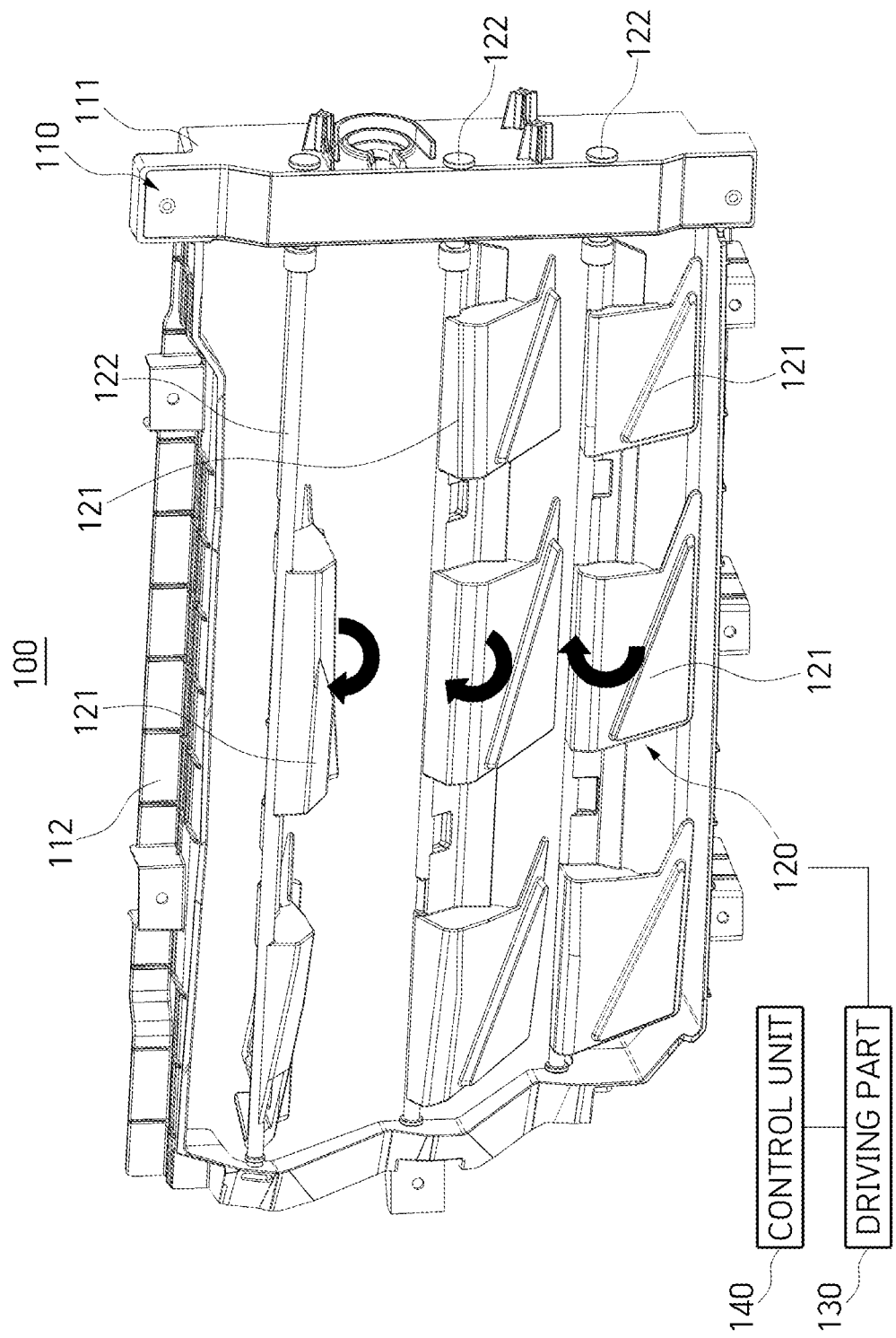
Figure 10:
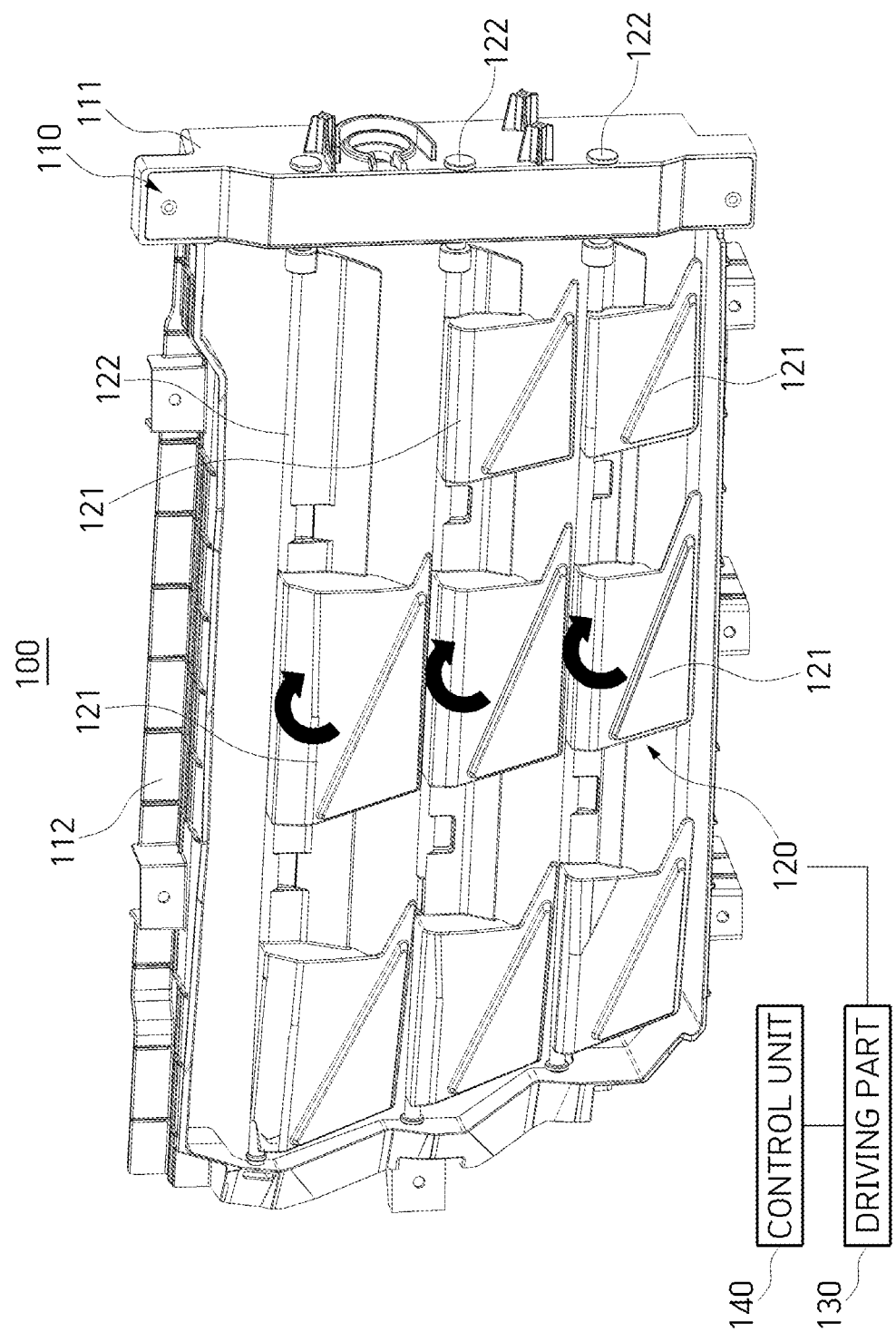

Then, FIGS. 8 to 10 are sequential views illustrating a mechanism in which the active air flap is closed.

Referring to the drawings, a closing mechanism of the active air flap 100 will be described below.

First, the actuator 131 of the driving part 130 is driven though an instruction of the control unit 140, and the driving pinion gear 132 connected to the driving shaft 131*a* of the actuator 131 is engaged with the rack gear 133 of the driving section 133*a* and rotated in the counter-clockwise direction.

Second, according to the rotation of the driving pinion gear 132 in the counter-clockwise direction, the rack gear 133 converts the rotational motion of the driving pinion gear 132 into linear motion and moves linearly in a downward direction.

Third, as the driven pinion gear 123 is engaged with the driven section 133*b* of the rack gear 133 and rotated in the clockwise direction, the linear motion of the rack gear 133 is converted into rotational motion again. Accordingly, the rotary shafts 122 which rotate in conjunction with the driven pinion gear 123 rotate in the clockwise direction, and the flap units 121 which operate in conjunction with the rotary shafts 122 rotate in the clockwise direction so that the outside air inlet is opened gradually.

In this process, the stopper 124 comes into line contact with the first and second guides 134a and 134b of the stopper guide 134 and assists the transmission of a rotational driving force to the rotary shafts 122. In addition, when the rotary shafts 122 idle in a state in which the flap units 121 are completely closed, the stopper 124 is in face contact with the first guide 134a so that the flap units 121 are fixed without shaking.

Modified Embodiment

Although an active air flap 100 of a vehicle according to a modified embodiment of the present invention is not separately illustrated in drawings, associated technical features will be described using symbols of illustrated components for the sake of convenience in the description.

In a flap part 120 of the active air flap 100 of the vehicle according to the modified embodiment of the present invention, a stopper 124 is not used, and a coil spring 150 is used to reduce a gap problem in a state in which flap units 121 are closed.

The coil spring 150 according to the modified embodiment may reduce a gap in a closed state of the flap part 120 using spring torsion.

In addition, when the flap part 120 of the vehicle which travels at a high speed is closed, an operational force of the coil spring 150 may be reduced using traveling wind. For example, when a value of the sum of a torque of an actuator 131 and a magnitude of the traveling wind is greater than a value of a tension of the coil spring 150, there is no operation problem of the active air flap of the present invention. As another example, even when a value of the sum of a torque of the actuator 131 and a tension of the coil spring 150 is greater than a value of a magnitude of the traveling wind, there is no operation problem of the active air flap of the present invention.

According to the present invention, an active air flap of a vehicle sequentially controls a plurality of flap units to be driven so that cooling efficiency is improved and there is an effect of improving fuel efficiency.

Particularly, the active air flap optimizes aerodynamic performance through individual operation of each flap unit so that a torque of an actuator can be reduced.

Accordingly, the active air flap can significantly reduce the resistance to air introduced from the outside of a grill while the vehicle travels and efficiently open or close a flap part even when an actuator having a low output is used.

In addition, since the active air flap has a structure capable of sequentially opening or closing an air inlet, the active air flap provides an advantage of being utilized as a factor for various exterior designs of the vehicle.

The present invention is not limited to the above-described embodiments and may be variously implemented within the range allowed by the technical spirit of the present invention.

What is claimed is:

1. An active air flap of a vehicle, comprising:
a frame part which communicates with an outside air inlet of a grill;
a flap part including a plurality of flap units which are rotatably connected to the frame part and sequentially open or close the outside air inlet of the grill, a rotary shaft which connects the plurality of flap units to the frame part, and a driven pinion gear connected to the rotary shaft;
a driving part which transmits a driving force to the flap part; and
a controller which controls the driving part to be driven,
wherein the flap part includes a stopper which fixes the flap units in an idle section when the flap units are rotated by the driving part.

2. The active air flap of claim 1, wherein the controller receives temperature information of an engine room of the vehicle, controls the driving part according to the temperature information, and sequentially opens or closes the flap units of the flap part.

3. The active air flap of claim 1, wherein the driving part includes:
an actuator including a driving shaft;
a driving pinion gear connected to the driving shaft;
a rack gear which is embedded in the frame part, has one side engaged with the driving pinion gear in a width direction so that upward and downward movement of the rack gear is adjusted in a vertical direction, and transmits the driving force to the driven pinion gear engaged with the other side of the rack gear in the width direction; and
a stopper guide which is positioned in a longitudinal direction of the rack gear and guides movement of the stopper.

4. The active air flap of claim 3, wherein the flap part includes a coil spring which is positioned on one end portion of the driving shaft and fixes relative positions of the frame part and the driven pinion gear.

5. An active air flap of a vehicle, comprising:
a frame part which has a hollow structure in which vertical frames and horizontal frames are connected and communicates with an outside air inlet of a grill;
a flap part which is rotatably connected to the frame part and opens or closes the outside air inlet of the grill; and
a driving part which provides a driving force to the flap part,
wherein the flap part includes a plurality of flap units which sequentially open or close the outside air inlet, rotary shafts which connect the plurality of flap units to the frame part, a driven pinion gear connected to each of the rotary shafts, and a stopper which is connected to the rotary shaft and fixes the flap units in an idle section of the rotary shaft.

6. The active air flap of claim 5, wherein the driving part includes:
an actuator including a driving shaft;
a driving pinion gear connected to the driving shaft;
a rack gear which is embedded in one of the vertical frames, has one side engaged with the driving pinion gear in a width direction so that upward and downward movement of the rack gear is adjusted in a vertical direction, and transmits the driving force to the driven pinion gear engaged with the other side of the rack gear in the width direction; and
a stopper guide which is positioned in a longitudinal direction of the rack gear and guides movement of the stopper.

7. The active air flap of claim 6, wherein the rack gear includes:
a driving section having a plurality of first teeth at one side engaged with the driving pinion gear in the width direction; and
a driven section having a plurality of second teeth at the other side engaged with the driven pinion gear in the width direction.

8. The active air flap of claim 6, wherein:

the stopper guide includes a first guide and a second guide which are disposed in the longitudinal direction of the rack gear at positions spaced apart from each other in the vertical direction; and a portion of the first guide and a portion of the second guide are chamfered to allow the chamfered portion of the first guide and the chamfered portion of the second guide to come into contact with the stopper.

9. The active air flap of claim 8, wherein the stopper is disposed between and comes into line contact with the first guide and the second guide while the flap units are opened or closed and is in face contact with the first guide or the second guide when the rotary shaft idles in a state in which the flap unit is completely opened or when the rotary shaft idles in a state in which the flap unit is completely closed.

10. The active air flap of claim 5, wherein the rotary shafts are disposed apart from each other between the vertical frames of the frame part in a vertical direction.

11. The active air flap of claim 5, wherein cross sections of connection parts of the rotary shafts and cross sections of connection parts of the flap units have the same polygonal shape to prevent torsion.

12. The active air flap of claim 5, wherein the rotary shafts are snap-fitted to the plurality of flap units in a longitudinal direction.

13. The active air flap of claim 5, further comprising a controller which controls the driving part to be driven through a preset instruction or manipulation of a separate switch.

14. An active air flap of a vehicle, comprising:

a frame part which communicates with an outside air inlet of a grill;

a flap part which opens or closes the outside air inlet; and a driving part which drives the flap part, wherein the flap part includes a plurality of flap units which are rotatably connected to the frame part and sequentially open or close the outside air inlet, a rotary shaft which connects the plurality of flap units to the frame part, a driven pinion gear connected to the rotary shaft, and a coil spring which fixes relative positions of the frame part and the driven pinion gear.

15. The active air flap of claim 14, wherein the driving part includes:

an actuator including a driving shaft having one end portion connected to the coil spring;

a driving pinion gear connected to the driving shaft; and a rack gear which is embedded in the frame part, has one side engaged with the driving pinion gear in a width direction so that upward and downward movement of the rack gear is adjusted in a vertical direction, and transmits a driving force to the driven pinion gear engaged with the other side of the rack gear in the width direction.

16. The active air flap of claim 15, wherein the rack gear includes:

a driving section having a plurality of first teeth at one side engaged with the driving pinion gear in the width direction; and a driven section having a plurality of second teeth at the other side engaged with the driven pinion gear in the width direction.

\* \* \* \* \*